(12) United States Patent
Ono et al.

(10) Patent No.: US 8,511,186 B2
(45) Date of Patent: *Aug. 20, 2013

(54) ENGINE STARTER

(75) Inventors: Hitoshi Ono, Kiryu (JP); Tomohiko Ikemori, Kiryu (JP); Shigeyuki Enkaku, Kiryu (JP); Chihiro Horikoshi, Hanyu (JP); Shinya Saito, Kiryu (JP); Shigehiro Kanbe, Maebasi (JP)

(73) Assignee: Mitsuba Corporation, Kiryu-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/448,203

(22) PCT Filed: Dec. 21, 2007

(86) PCT No.: PCT/JP2007/001450
§ 371 (c)(1),
(2), (4) Date: Mar. 25, 2010

(87) PCT Pub. No.: WO2008/078412
PCT Pub. Date: Jul. 3, 2008

(65) Prior Publication Data
US 2010/0294078 A1    Nov. 25, 2010

(30) Foreign Application Priority Data

Dec. 26, 2006  (JP) ................................. 2006-348819
Dec. 26, 2006  (JP) ................................. 2006-348820

(51) Int. Cl.
*F02N 15/02* (2006.01)
(52) U.S. Cl.
USPC ........................................................ 74/7 C
(58) Field of Classification Search
USPC ................... 74/7 C, 6, 7 A, 7 R; 192/42, 46; 123/179.1; 428/698, 472.2, 469, 627; 148/318, 148/230, 206–214
See application file for complete search history.

(56) References Cited

U.S. PATENT DOCUMENTS

| 3,022,204 | A * | 2/1962 | Muller et al. .................. 148/228 |
| 4,986,140 | A * | 1/1991 | Morishita et al. ............... 74/7 C |
| 6,315,455 | B1 * | 11/2001 | Tanaka et al. .................. 384/492 |
| 7,370,741 | B2 * | 5/2008 | Shimomura et al. ............ 192/42 |
| 2002/0170425 | A1 * | 11/2002 | Tarutani et al. .................... 92/70 |
| 2009/0145263 | A1 * | 6/2009 | Ono et al. ........................ 74/7 C |
| 2010/0294078 | A1 * | 11/2010 | Ono et al. ........................ 74/7 C |

FOREIGN PATENT DOCUMENTS

| JP | Y2-59-26107 | 7/1984 |
| JP | A-4-185921 | 7/1992 |
| JP | U-5-42675 | 6/1993 |
| JP | A-2000-346077 | 12/2000 |
| JP | A-2004-76823 | 3/2004 |
| WO | WO 2006/043579 A1 | 4/2006 |

OTHER PUBLICATIONS

Darbellay, Jerome; "Gas Nitriding: An Industrial Perspective"; Mar. 22, 2006; http://coursenotes.mcmaster.ca/701-702_Seminars/2005-2006/701_JeromeDarbellay_March_2006.pdf.*

* cited by examiner

*Primary Examiner* — Justin Krause
*Assistant Examiner* — Gregory Prather
(74) *Attorney, Agent, or Firm* — Oliff & Berridge, PLC

(57) ABSTRACT

Excellent durability can be achieved by reducing thermal influences of the excessive load from the engine side for a clutch roller (13) in a unidirectional rotation clutch system that is helical-splined to a drive shaft that rotates in response to a driving force of a motor and structured such that the motor driving force can be transmitted while an engine driving force cannot be transmitted when an engine stars, wherein a compound film composed of an external mixed phase and an internal diffused phase is formed on the clutch roller (13) subjected to nitriding by tufftriding with nitrogen being penetrating and diffusing.

4 Claims, 5 Drawing Sheets

ENGINE STARTER

CROSS-REFERENCE TO RELATED APPLICATIONS

This application is the U.S. National Phase of PCT/JP2007/001450, filed Dec. 21, 2007, which claims priority from Japanese Patent Application No. 2006-348819, filed Dec. 26, 2006 and Japanese Patent Application No. 2006-348820, filed Dec. 26, 2006, the entire disclosure of which is incorporated herein by reference hereto.

BACKGROUND

The present disclosure relates to an engine starter.

There exists an engine starter that is constructed as shown in FIGS. 1, 2, 3A, and 3B. A motor (electric motor) M of an engine starter 1 uses a general-purpose brush-type DC motor. A base end of a motor shaft 2 is axially and rotatably supported on an end cover 3a that closes a base end side opening of a cylindrical yoke 3. A commutator 4 is integrally fitted onto a tip end of the motor shaft 2. To an outer periphery of the commutator 4, in a tip end side opening of the yoke 3, a ring-shaped holder stay 5 is mounted.

Reference numeral 6 denotes a bottomed cylindrical case (see FIG. 1). The case 6 forms a reduction gear D that is disposed to a tip end side of the motor M, that is, adjacent to the holder stay 5. In the case 6, a tip end 2a of the motor shaft 2 is installed. A base end of a drive shaft 7 is also disposed in the case 6 so as to rotatably fit onto the motor shaft tip end 2a. In the case 6, a plurality of planet gears 8 are also concentrically disposed with respect to the motor shaft tip end 2a so as to engage with the motor shaft tip end 2a and rotate circumferentially inside the case 6 according to the rotation of the motor shaft 2. A ring-shaped support plate 9 is also installed in the case 6 so as to be integrated with the planet gears 8 via a support shaft 9a. By fitting an inner peripheral surface of the support plate 9 integrally onto the drive shaft 7, a circumferential rotation of the planet gears 8 is interlocked with and joined to the drive shaft 7. A driving force of the motor M is thus transmitted to the drive shaft (pinion shaft) 7 in a reduced speed manner.

A unidirectional rotation clutch system C is disposed on a tip end of the drive shaft 7 (see FIG. 1). A clutch outer 10 of the clutch system C is formed of a stepped cylinder. The clutch outer 10 is fit onto the drive shaft 7 such that a helical spline 10a that is formed on an inner peripheral surface of a small-diameter cylinder is engaged with a helical spline 7a that is engraved in an outer peripheral surface of the tip end of the drive shaft 7. When relative rotation occurs between the drive shaft 7 and the clutch outer 10 in a predetermined rotating direction from a side of the drive shaft 7, the clutch outer 10 rotatively moves along the helical spline 7a of the drive shaft 7 and then moves to an active position on a tip end side (a position shown in a lower half of FIG. 1) from an inactive position (a position shown in an upper half of FIG. 1) on the base end side of the drive shaft 7. To an inside of a large-diameter cylinder on a tip end side of the clutch outer 10, a clutch inner 12 is joined that includes a pinion gear 11 that is formed on a tip end outer periphery and engages with a ring gear 11a on an engine side. The clutch inner 12 moves axially and integrally with the clutch outer 10.

Reference numeral 13 denotes a clutch roller to be interposed between the clutch outer 10 and the clutch inner 12 (see FIGS. 1, 2, 3A, and 3B). Reference numeral 14 denotes a spring that urges the clutch roller 13 toward a side of a clutch outer wall. The clutch roller 13 is housed in a roller chamber 10g that is recessed in an inner peripheral surface of the clutch outer 10. In the roller chamber 10g, as shown in FIG. 2 and FIGS. 3A and 3B, an opposing distance is larger between the clutch inner 12 and the clutch outer 10 at a rotation side end 10b of a clockwise side so as to allow the clutch roller 13 to freely rotate. The opposing distance is narrower toward an engagement side end 10c of a counterclockwise side. When the motor M is halted, as shown in FIG. 2 and FIG. 3A, the clutch roller 13 is positioned at an intermediate position between ends 10b and 10c because of an urging force of the spring 14. In this state, because the clutch roller 13 does not engage with the clutch outer 10 and the clutch inner 12, a driving force is not transmitted. When the clutch outer 10 rotates clockwise, as shown by an arrow in FIG. 2, in response to driving of the motor M, then the clutch roller 13 moves to an engagement side end 10c, which is shown in FIG. 3B. An engaged state is thus set; and a rotating force of the clutch outer 10 is transmitted to the clutch inner 12 via the clutch roller 13. As a result, an engine starts.

When the engine starts, an overrun occurs such that rotation of the clutch inner 12 is faster than that of the clutch outer 10. As shown in FIG. 3A, the clutch inner 12 then rotates counterclockwise (an arrow direction) relatively to the clutch outer 10. The clutch roller 13 then moves toward the rotation side end 10b and freely rotates. This clutch unit thus functions as a one-way clutch unit that prevents the engine driving force from being transmitted to a side of the clutch outer 10 from the clutch inner 12 (see Japanese Published Examined Utility Model Application No. S59-26107 and Japanese Published Unexamined Utility Model Application No. H05-42675, for example).

SUMMARY

However, the ring gear 11a on a side of the engine may abnormally rotate while the engine starts because of some defective actuation, such as a defective ignition in the engine. A torque also may impact the drive shaft 7 from the pinion gear 11 because of the abnormal rotation of the ring gear 11a. In such a case, a load from the engine side that exceeds a normal torque load affects the clutch system C. The clutch roller 13 then reaches the engagement side end 10c as shown in FIG. 3B. If the torque impact is so large that the abnormal load exceeds a maximum normal force of the clutch roller 13, then the clutch roller 13 slips while engaging with the clutch inner 12. A high temperature state then occurs because of a frictional heat caused by the slipping. As a result, a softened portion 13a of the clutch roller 13 is generated, as shown in FIGS. 4A and 4B. Being subjected to shearing stress, such softened composition plastically flows. A drawn portion 13b is then formed (see FIG. 4A). If the drawn portion 13b exceeds a ductility limit of the material, then a breakage (exfoliation) 13c occurs. The clutch roller 13 then deforms (see FIG. 4B).

If the clutch roller 13 deforms, an engagement allowance (overlapping allowance) of the clutch roller 13 cannot be secured at the time when the engine starts. The clutch system C then idles, and as a result, the engine cannot smoothly start. The present disclosure solves the problems and is able to achieve various advantages.

The disclosure according to a first exemplary aspect provides an engine starter that includes a motor that includes a drive shaft that rotates in response to a motor driving force; and a unidirectional rotation clutch system that is helical-splined to the drive shaft, the clutch system being structured such that the motor driving force can be transmitted while an engine driving force cannot be transmitted when an engine starts. The clutch system includes a clutch inner; a clutch outer; a clutch roller that is interposed between the clutch outer and the clutch inner; and a spring that urges the clutch roller. A soft nitriding treatment is applied to a surface of the clutch roller or surfaces of the clutch outer and the clutch inner, the soft nitriding treatment being gas soft nitriding.

The disclosure according to a second exemplary aspect provides the engine starter according to the first exemplary aspect, wherein the gas soft nitriding is formed on the surface of the clutch roller.

The disclosure according to a third exemplary aspect provides the engine starter according to the first or second exemplary aspect, wherein a clutch roller contacting surface of the clutch inner extends long in an axial direction.

The disclosure according to a fourth exemplary aspect provides an engine starter that includes a motor that includes a drive shaft that rotates in response to a motor driving force; and a unidirectional rotation clutch system that is helical-splined to the drive shaft, the clutch system being structured such that the motor driving force can be transmitted while an engine driving force cannot be transmitted when an engine starts. The clutch system includes a clutch inner; a clutch outer; a clutch roller that is interposed between the clutch outer and the clutch inner; and a spring that urges the clutch roller. A soft nitriding treatment is applied to a surface of the clutch roller or surfaces of the clutch outer and the clutch inner, the soft nitriding treatment being tufftriding.

The disclosure according to a fifth exemplary aspect provides the engine starter according to the fourth exemplary aspect, wherein the tufftriding is formed on the surface of the clutch roller.

The disclosure according to a sixth exemplary aspect provides the engine starter according to the fourth or fifth exemplary aspect, wherein a clutch roller contacting surface of the clutch inner extends long in an axial direction.

According to the first exemplary aspect, one of the sliding contact surfaces between the clutch roller and the clutch outer and the clutch inner that come into sliding contact with the clutch roller includes a mixed phase of $\epsilon(Fe_{2+3}N)$(epsilon) and $Fe_3C$; and a diffused phase of $\gamma'(Fe_4N)$(gamma prime) inside the mixed phase. As a result, the sliding contacting surface can be stabilized as being a heterogeneous contact. Abrasion and fatigue resistance is thus excellent. Durability can also be improved against the excessive load from the engine side.

According to the second exemplary aspect, because the gas soft nitriding can be formed on the clutch roller, an easy compound film formation can be achieved.

According to the third exemplary aspect, because the contacting surface of the clutch roller with the clutch inner is axially long, even if an end face of the clutch inner is chamfered or a bottom surface of the clutch outer is drafted, the clutch roller can come into contact with circumferential surfaces that are not chamfered or drafted. Local contacting with the clutch roller can thus be prevented. As a result, a uniform force can be applied, and the clutch life can also last longer.

According to the fourth exemplary aspect, one of the sliding contact surfaces between the clutch roller and the clutch outer and the clutch inner that come into sliding contact with the clutch roller includes a mixed phase of $\epsilon(Fe_{2+3}N)$(epsilon) and $Fe_3C$; and a diffused phase of $\gamma'(Fe_4N)$(gamma prime) inside the mixed phase. As a result, the sliding contacting surface can be stabilized as being a heterogeneous contact. Abrasion and fatigue resistance is thus excellent. Durability can also be improved against the excessive load from the engine side.

According to the fifth exemplary aspect, because the tufftriding can be formed on the clutch roller, an easy compound film formation can be achieved.

According to the sixth exemplary aspect, because the contacting surface of the clutch roller with the clutch inner is axially long, even if an end face of the clutch inner is chamfered or a bottom surface of the clutch outer is drafted, the clutch roller can come into contact with circumferential surfaces that are not chamfered or drafted. Local contacting with the clutch roller can thus be prevented. As a result, a uniform force can be applied, and the clutch life can also last longer.

BRIEF DESCRIPTION OF THE DRAWINGS

Various embodiments of the disclosure will be described with reference to the drawings, wherein.

DETAILED DESCRIPTION OF EMBODIMENTS

Focusing on the fact that the deformation of the clutch roller 13 has been caused by heating, a measure is formulated in order to prevent the deformation of the clutch roller by (1) reducing heating values; and (2) increasing strength against thermal softening.

First, a heating value is examined. The heating value Q is as follows:

$$Q = \mu P V$$

wherein $\mu$ represents a friction coefficient; P represents load; and V represents velocity. Reduction in contact surface pressure and friction coefficient are thus to be achieved. As being about the mechanical, however, the former is provisionally excluded from the present development theme. The reduction in friction resistance will thus be examined herein.

Figure 5A:
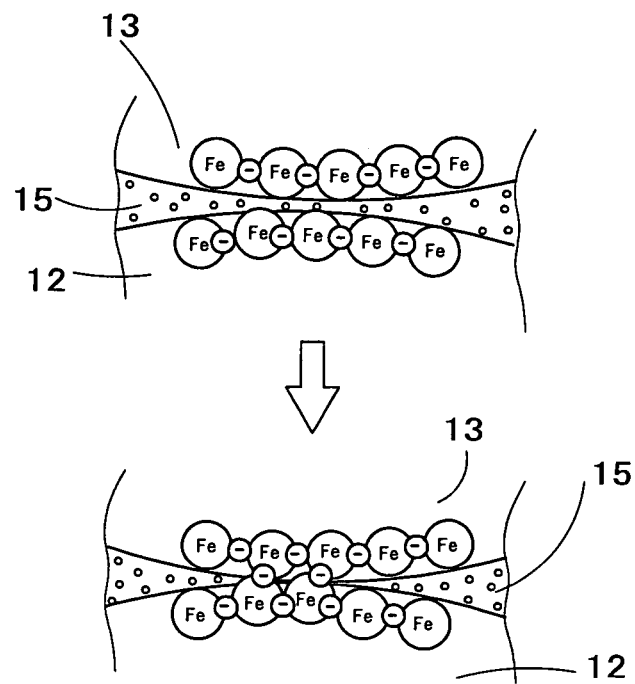
FIG. 5A is an explanatory view showing a mechanism of friction between irons.

A friction between the clutch inner 12 and the clutch roller 13 is a friction of metals (irons). As a normal condition, grease (lubricant or clutch grease) is interposed at a space 15 between the clutch inner 12 and the clutch roller 13. However, when a load is imposed, the clutch inner 12 and the clutch roller 13 directly contact with each other and slide as shown in FIG. 5A. At sliding portions, electron migration then occurs. As a result, the sliding portions adhere to each other between the clutch inner 12 and the clutch roller 13. A force that separates the sliding portions is thus a frictional force. In other words, a measure for reducing such friction coefficient is to prevent the electron migration.

Figure 5B:
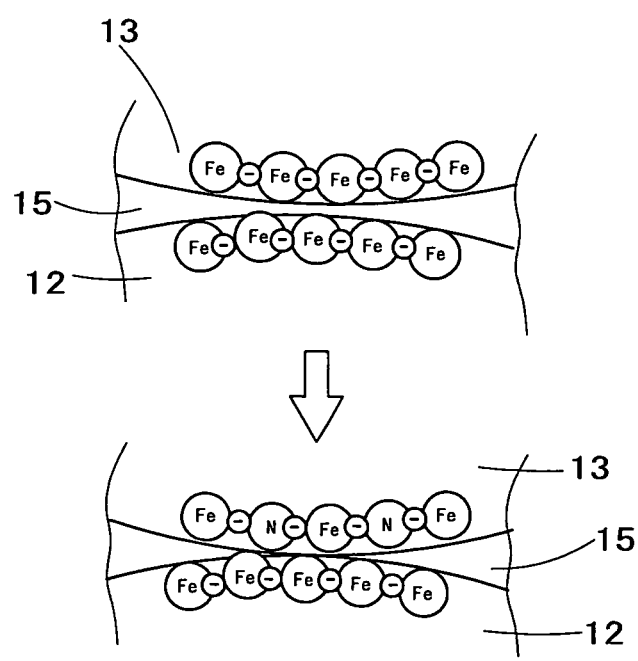
FIG. 5B is an explanatory view showing a mechanism of friction between irons and nitrided-irons.

An effective proposal includes a chemically stable substance being on the sliding and contacting surfaces. A stable compound film can thus be formed on one of the sliding surfaces of the clutch system C, in which the clutch roller 13 comes into sliding contact with both the clutch outer 10 and the clutch inner 12. By simply forming a compound film on the surface of the clutch roller 13, the sliding portions of both the clutch outer 10 and the clutch inner 12 can be reduced in friction resistance as shown in FIG. 5B. The compound film may instead be formed on both surfaces of the clutch outer 10 and the clutch inner 12, which ultimately reduces the friction resistance as coming into sliding contact with the clutch roller 13.

Figure 1:
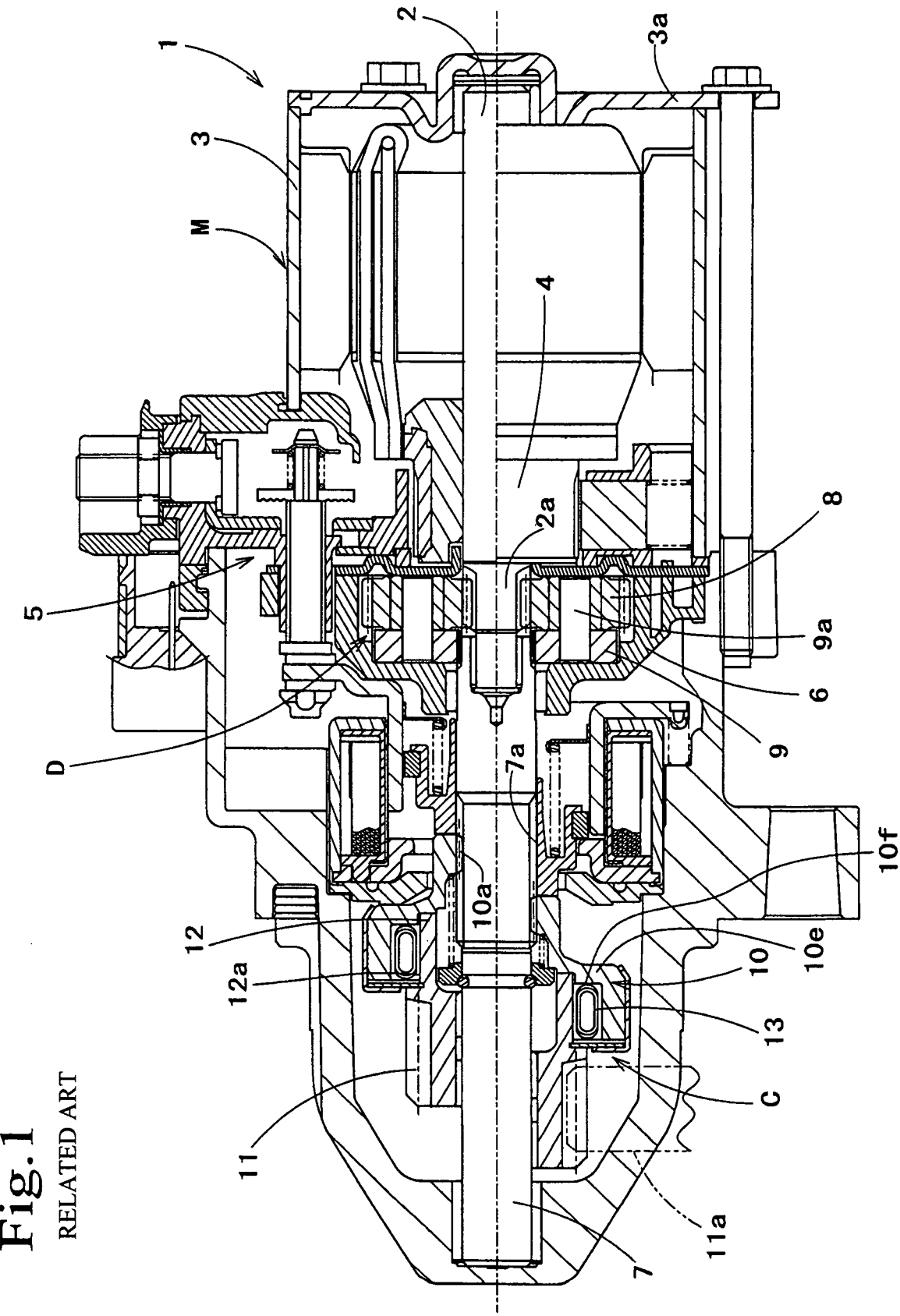
FIG. 1 is a partial sectional front view of an engine starter.
Figure 2:
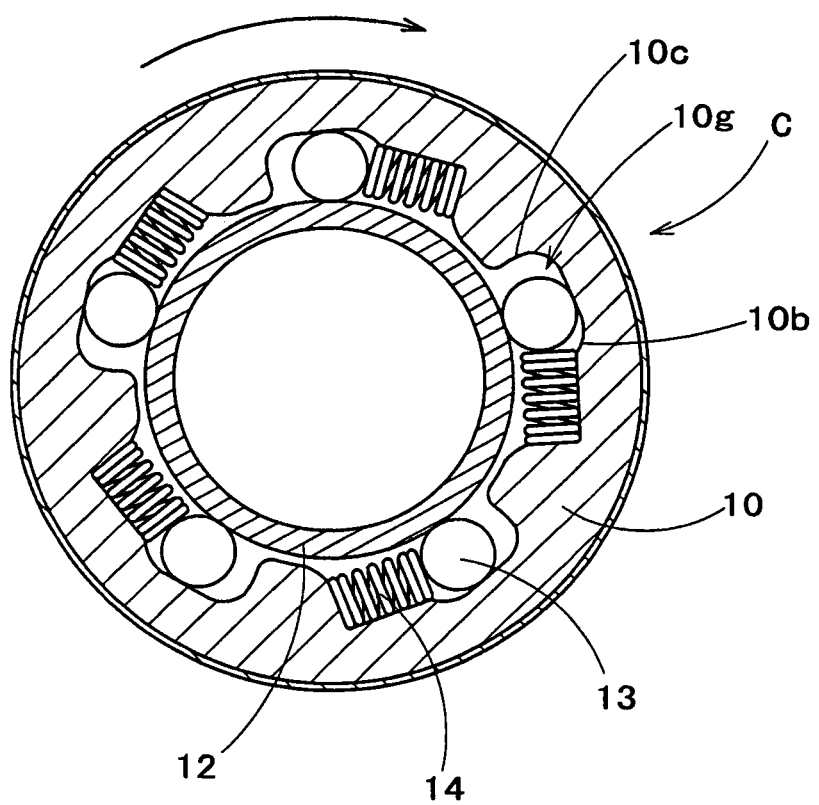
FIG. 2 is a sectional view of a clutch system.
Figure 3A:
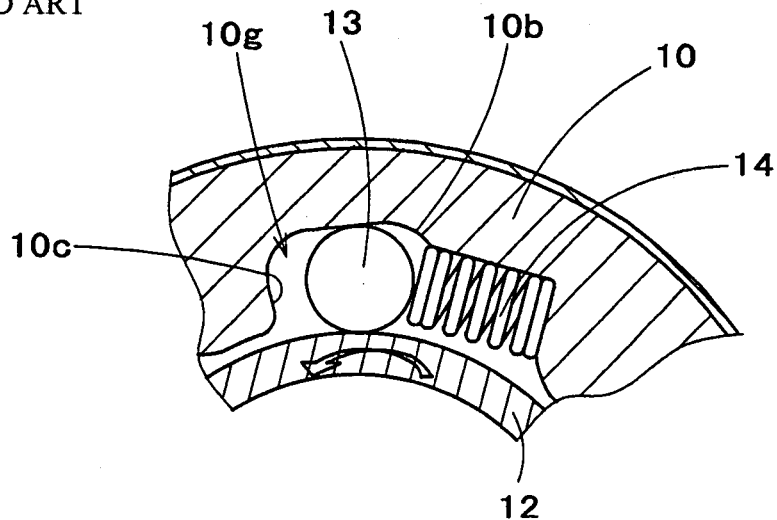
FIG. 3A is a main portion enlarged sectional view of the clutch system at a time of cranking.
Figure 3B:
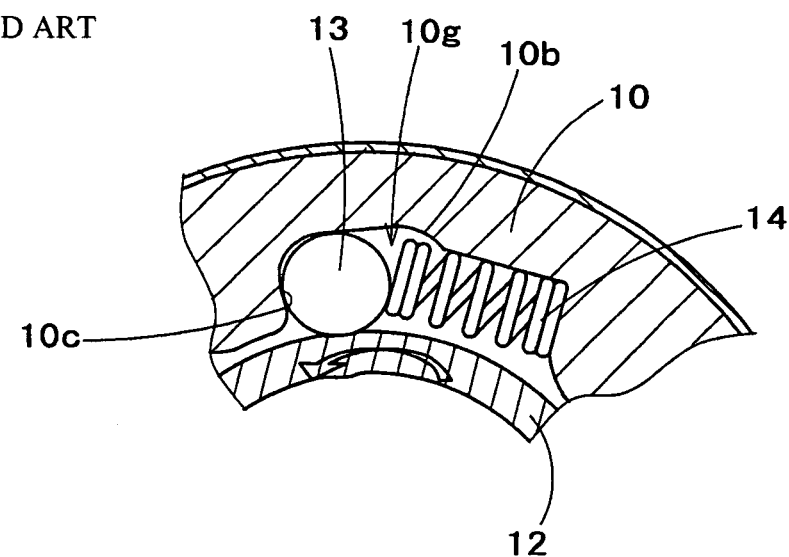
FIG. 3B is a main portion enlarged sectional view of the clutch system at a time of torque limiter actuation.
Figure 4A:
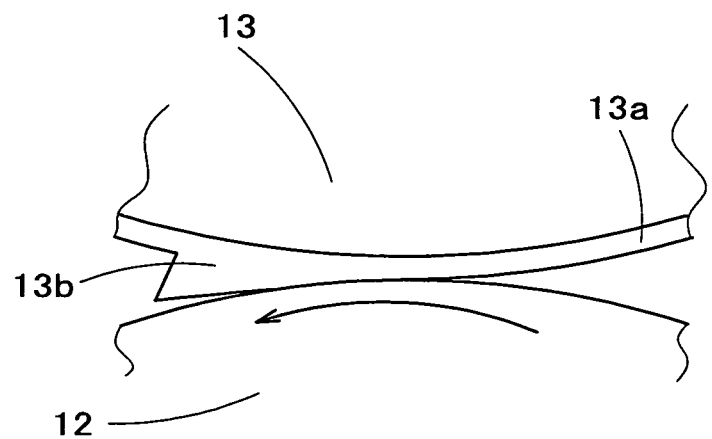
FIGS. 4A and 4B are explanatory views showing a mechanism of deformation of a clutch roller.
Figure 4B:
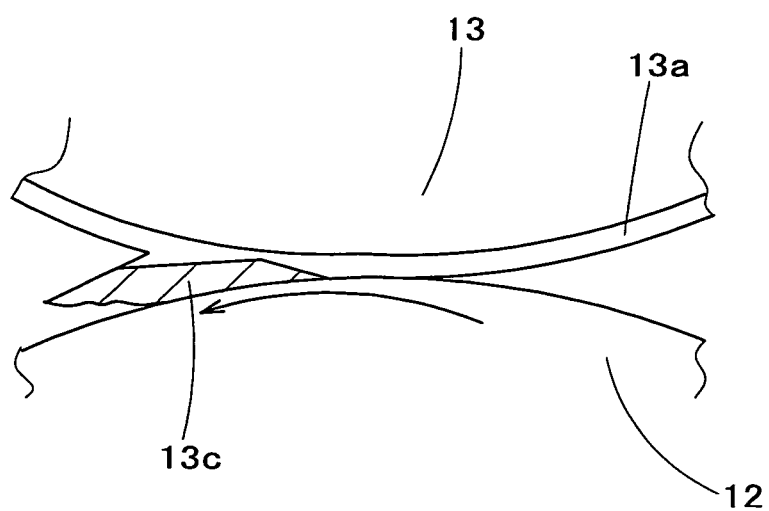

A circumferential surface 12a of the clutch inner 12 (see FIG. 1), with which the clutch roller 13 comes into contact, extends toward a side of the motor M in an axial direction. An extending end of the circumferential surface 12a is fit and incorporated in an attaching portion 10f that is recessed in a bottom surface 10e of the clutch outer 10. The clutch roller 13 comes into contact with the circumferential surface 12a of the clutch inner 12. Even if a clutch inner end face is chamfered or the clutch outer bottom surface 10e is drafted, the clutch roller 13 comes into contact with a circumferential surface that includes no chamfered or drafted portions. Local contacts with the clutch roller 13 do not occur, and a uniform force is also applied. As a result, a longer lifetime of the clutch can be achieved.

When such a compound film is formed, nitrogen can be used because of its firm bonding with iron. The compound film can thus be easily formed by nitriding. As such nitriding, gas soft nitriding is exemplified.

According to a first embodiment, the clutch roller 13 is made of a bearing steel (for example, SUJ2), and its surface is nitrided by gas nitriding. Carbon nitride is formed on the surface by a method via steps of adding 30 to 50 percent of ammonia ($NH_3$) gas into a carbonaceous gas or nitrogen gas atmosphere, heating and holding for 30 minutes to 5 hours in an atmosphere with a temperature of 550 to 600 degrees Celsius, and penetrating and diffusing nitrogen and carbon together. By this method, a nitride phase with 0.7 to 0.8mm is formed on the surface of the clutch roller 13. As the nitride phase, formed on the surface is a mixed phase (hereinafter, referred to as "external phase") of $\epsilon(Fe_{2+3}N)$ and $Fe_3C$ with a thickness of approximately 14 μm (micrometers) that contains iron as a main component. As a diffused phase, formed inside the external phase is a $\nu'(Fe_4N)$ phase (hereinafter, referred to as "internal phase") with a thickness of approximately 4 μm. Hardness of the surface is slightly changed to Hv 700-800 from Hv 760 before being nitrided.

Actual machine tests are repeated 20 times with the clutch roller 13 thus gas-nitrided. For the actual machine tests, two different samples of the clutch roller 13 are used: a clutch roller that is nitrided after being quenched (sample 1) and a clutch roller that is nitrided without being quenched (sample 2). In addition, as a blank, a clutch roller that is just quenched is also used for the tests.

According to the test results, tissue changes under thermal influences can be observed in surface layers of the blank clutch roller. The surface layers are then plastically deformed and exfoliated. Several tens of micrometers of the exfoliation can also be observed. As for the samples 1 and 2, on the other hand, although external phases completely decay because of abrasions, the internal phases mostly last without being exfoliated. Thermal influences can also hardly be observed on those clutch rollers in themselves, which can continuously be used. In addition, the samples 1 and 2 being observed further, the internal phases remain thicker in the sample 2 than in the sample 1. The clutch roller 13 that is nitrided without being quenched is thus excellent in durability.

According to a second embodiment, a clutch roller 13 is made of a bearing steel (for example, SUJ2) and nitrided by tufftriding (salt bath soft nitriding). Carbon nitride is formed on a surface of the clutch roller 13 by a method via steps of adding potassium cyanide or potassium carbonate into a titanium crucible so as to be molten, blowing air into the crucible, heating for 30 to 240 minutes with a temperature of approximately 570 degrees Celsius, and cooling by oil or water after the heating. By this method, a nitride phase with 0.7 to 0.8mm is formed on the surface of the clutch roller 13. By this method, a nitride phase with 0.7 to 0.8mm is formed on the surface of the clutch roller 13. As the nitride phase, formed on the surface side is a mixed phase (hereinafter, referred to as "external phase") of $\epsilon(Fe_{2+3}N)$ and $Fe_3C$, containing iron as a main component, with a thickness of approximately 14 μm (micrometers). As a diffused phase, formed inside the external phase is a $\nu'(Fe_4N)$ phase (hereinafter, referred to as "internal phase") with a thickness of approximately 4 vm. Hardness of the surface is slightly changed to Hv 670 from Hv 760 before being nitrided.

Actual machine tests are repeated 20 times with the clutch roller 13 thus gas-nitrided. For the actual machine tests, two different samples of the clutch roller 13 are used: a clutch roller that is nitrided after being quenched (sample 3) and a clutch roller that is nitrided without being quenched (sample 4). In addition, as a blank, a clutch roller that is just quenched is also used for the tests.

According to the test results, tissue changes under thermal influences can be observed in surface layers of the blank clutch roller. The surface layers are then plastically deformed and exfoliated. Several tens of micrometers of the exfoliation can also be observed. As for the samples 3 and 4, on the other hand, although external phases completely decay because of abrasions, the internal phases mostly last without being exfoliated. Thermal influences can also hardly be observed on those clutch rollers in themselves, which can continuously be used. In addition, the samples 3 and 4 being observed further, the internal phases remain thicker in the sample 4 than in the sample 3. The clutch roller 13 that is nitrided without being quenched is thus excellent in durability.

The present invention is useful for an engine starter for starting an engine (internal combustion) installed in a vehicle. One of the sliding contact surfaces between the clutch roller, and the clutch outer and the clutch inner that come into sliding contact with the clutch roller can be stabilized as being a heterogeneous contact. Abrasion and fatigue resistance is thus excellent. Durability can also be improved against the excessive load from the engine side.

What is claimed is:

1. An engine starter, comprising:
    a motor that includes a motor shaft that rotates in response to a motor driving force;
    a reduction mechanism to engage with the motor shaft and transmit a driving force to a drive shaft;
    a unidirectional rotation clutch system that is helical-splined to the drive shaft, the clutch system being movable from an inactive position on a base end side of the drive shaft to an active position on a tip end side of the drive shaft when relative rotation occurs in a predetermined rotating direction from a side of the drive shaft, and further being structured such that the motor driving force can be transmitted while an engine driving force cannot be transmitted when an engine starts; and
    a pinion gear that connects with the clutch system and engages with a ring gear on a side of the engine, wherein:
    the clutch system comprises:
        a clutch inner;
        a clutch outer;
        a clutch roller that is interposed between the clutch outer and the clutch inner; and
        a spring that urges the clutch roller,
    the clutch roller slips while engaging with the clutch inner when a torque impacts the drive shaft from the side of the engine, the clutch roller is made of bearing steel, and a gas soft nitriding treatment is applied to a surface of the clutch roller such that an external phase and an internal phase are formed on the surface of the bearing steel, wherein the gas soft nitriding treatment is not applied to a surface of the clutch inner and the gas soft nitriding treatment is not applied to a surface of the clutch outer, so that a nitride phase is formed, where a mixed phase of $Fe_{2+3}N$ and $Fe_3C$ is formed on the surface as the external phase and a diffused phase of $Fe_4N$ is formed inside the external phase as the internal phase.

2. The engine starter according to claim 1, wherein a clutch roller contacting surface of the clutch inner extends long in an axial direction.

3. An engine starter, comprising:

a motor that includes a drive shaft that rotates in response to a motor driving force; and a unidirectional rotation clutch system that is helical-splined to the drive shaft, the clutch system being movable from an inactive position on a base end side of the drive shaft to an active position on a tip end side of the drive shaft when relative rotation occurs in a predetermined rotating direction from a side of the drive shaft, and further being structured such that the motor driving force can be transmitted while an engine driving force cannot be transmitted when an engine starts, wherein:

the clutch system comprises:
 a clutch inner;
 a clutch outer;
 a clutch roller that is interposed between the clutch outer and the clutch inner; and
 a spring that urges the clutch roller, the clutch roller slips while engaging with the clutch inner when a torque impacts the drive shaft from a side of the engine, the clutch roller is made of bearing steel, and a salt bath soft nitriding treatment is applied to a surface of the clutch roller such that an external phase and an internal phase are formed on the surface of the bearing steel, wherein the salt bath soft nitriding treatment is not applied to a surface of the clutch inner and the salt bath soft nitriding treatment is not applied to a surface of the clutch outer, so that a nitride phase is formed, where a mixed phase of $Fe_{2+3}N$ and $Fe_3C$ is formed on the surface as the external phase and a diffused phase of $Fe_4N$ is formed inside the external phase as the internal phase.

4. The engine starter according to claim 3, wherein a clutch roller contacting surface of the clutch inner extends long in an axial direction.

\* \* \* \* \*